United States Patent [19]
Benoit et al.

[11] 3,837,755
[45] Sept. 24, 1974

[54] MULTI-PIECE ROD FOR CONTROL AND STRUCTURAL MEMBERS

[75] Inventors: Robert L. Benoit, Franklin Square; Winslow W. Peters, Lindenhurst; Joseph Morgan, Babylon, all of N.Y.

[73] Assignee: Grumman Aerospace Corporation, Bethpage, N.Y.

[22] Filed: Oct. 17, 1973

[21] Appl. No.: 407,178

[52] U.S. Cl. .................................. 403/274, 29/516
[51] Int. Cl. ............................................. F16b 7/00
[58] Field of Search ........... 403/274, 282, 278, 285; 285/382; 29/516, 517

[56] References Cited
UNITED STATES PATENTS 1,169,642  1/1916  Heeter et al. .................... 403/274 X
2,429,293  10/1947  Peck et al. ...................... 29/517 UX
3,792,603  2/1974  Orain ............................. 29/517 X

*Primary Examiner*—Andrew V. Kundrat
*Attorney, Agent, or Firm*—Morgan, Finnegan, Durham, & Pine

[57] ABSTRACT

A multi-piece rod employing a thin central tubular member in combination with end members. The end members are provided with circumferential grooves and advantageously a knurled section. The circumferential grooves have a critical diameter and configuration for receiving the tubular member to effect attachment therebetween.

4 Claims, 2 Drawing Figures

PATENTED SEP 24 1974  3,837,755

MULTI-PIECE ROD FOR CONTROL AND STRUCTURAL MEMBERS

BACKGROUND OF THE INVENTION

1. Field of the Invention

The present invention relates generally to attachment of tubular parts to mating members. More specifically, the invention relates to attachment of tubular rods to end members to form a composite structure which has particular application in aerospace control rods and structural members.

2. Description of the Prior Art

At present, aircraft control and structural rods are tubular members which have discrete end connections. The tubular rods are attached to the end members by rivets. The tubular form of rods is desirable on aircraft due to the superior buckling strength to weight ratio of tubular structures compared to other structures. However, the riveted connections of the tubular members to the end members result in a weak link, where failure is most likely to occur.

Tubular members have been joined to end fittings in other arts by means other than riveting. For example, U.S. Pat. No. 1,169,642 (Heeter; issued Jan. 25, 1916), U.S. Pat. No. 3,239,930 (Violleau; issued Mar. 15, 1966), U.S. Pat. No. 3,432,016 (Fisher et al; issued Mar. 18, 1969), and U.S. Pat. No. 3,652,111 (Dent; issued Mar. 28, 1972), all disclose tubular members which are joined to end fittings by a deformation technique. Generally, the fittings are provided with grooves machined in their outer surface. The tubular members fit over the machined fittings and are deformed to conform to the contour of the grooves. Thus, attachment between the members is effected.

Several methods for upsetting or radially deforming tubular members are well known. Swaging, explosive forming, rubber press forming and electromagnetic forming are illustrative of presently known methods.

SUMMARY OF THE INVENTION

It is an object of the present invention to provide a multi-piece rod wherein a tube member having the minimum tube wall thickness for the required strength can be secured to end members by an upset or radial deformation technique.

To this end, the invention provides end members which have a circumferential groove or grooves into which the radially deformed portions of the tubular member fit to effect attachment of the part. The outer or major diameter of the end member must be from 1.03 to 1.48 times as large as the diameter of the grooves. The width of the groove must be 4.90 to 8.67 times the depth of the groove. The groove must have radii formed at the upper and lower corners. The depth of the groove must have a relationship to the lower corner radii wherein the ratio is 0.75 to 3.50. The angle which the side walls make with the groove surface and the outer surface of the member in which the groove is located must be 40° − 65°. The ratio of the tube metal thickness to the radius at the corner where the groove meets the major diameter of the end fitting must be between 0.70 and 4.10.

DESCRIPTION OF THE DRAWINGS

The invention will be explained in detail in the subsequent section with respect to the drawing, in which.

DESCRIPTION OF THE PREFERRED EMBODIMENT

Figure 1:
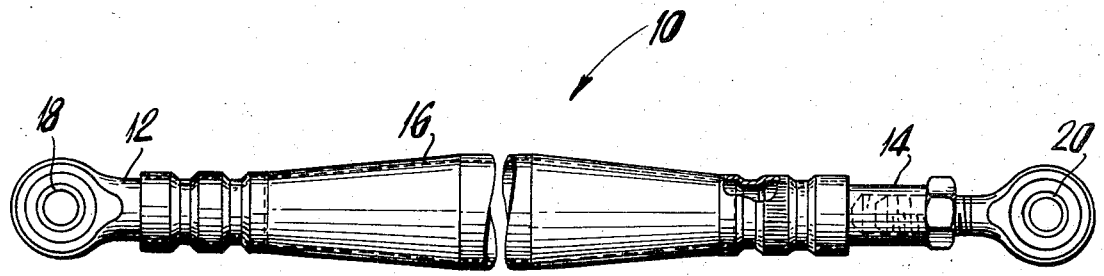
FIG. 1 is a perspective view of the composite rod assembly.

The composite rod assembly 10 seen in FIG. 1 is comprised essentially of end members 12 and 14 and a tubular central member 16. The tubular central member 16 provides almost the entire length of the composite rod assembly 10. The end members 12 and 14 serve as terminal attachment members to connect the rod assembly 10 to the components with which it is to be used.

The end members 12 and 14 are provided with suitable means such as bolt holes 18 and 20 for attaching the assembled rod 10 to an associated assembly.

Figure 2:
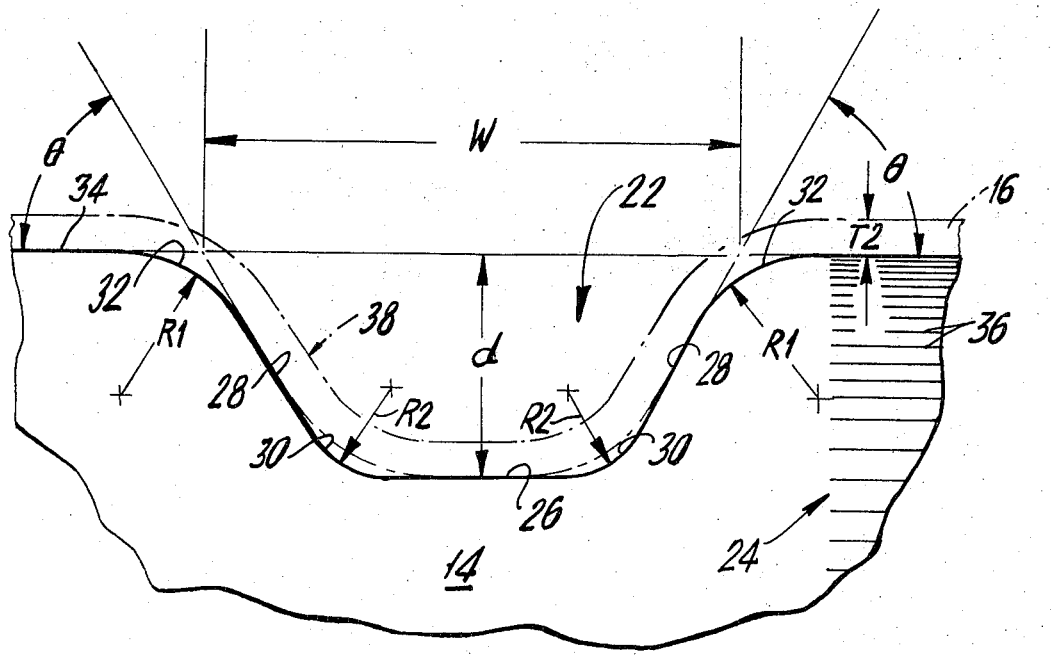
FIG. 2 is an enlarged view of the rod assembly showing the tubular member mating over a groove in the end member.

Referring to FIG. 2, each end member 12 and 14 is provided with a groove 22 or a plurality of grooves 22. Advantageously, knurled surface 24 may be positioned adjacent the groove 22, or if used in the plural groove embodiment, adjacent any one of the grooves 22. In the plural groove embodiment, each of the grooves 22 has the same configuration.

The groove 22 has a bottom surface 26 and side walls 28. Radii are also provided in the grooves 22 at the corners 30 where the bottom surface 26 meets the side walls 28 and at the corners 32 where the side walls 28 meet the surface 34 formed by the outer diameter of the end members 12 or 14.

The radius at the corner 30 and the radius at the corners 32 are typically measured by Profile Gaging or Shadowgraph techniques.

The grooves 22 are critically configured to provide maximum securement of the tubular member 16 to the end members 12 and 14. The groove configuration provides positive securement for permanent attachment with a minimum strain or fatigue imposed on the deformed tubular member 16. In aircraft applications where weight reduction is important it is vital that the absolute minimum tube wall thickness be provided in control and structural rod applications. The dimensions of the grooves 22 in the end members 12 and 14 enables the use of the absolute minimum tube wall thickness in the central tubular rod 16.

The grooves 22 must have a relationship to the end members 12 and 14 such that the outer or major diameter of the end members 12 and 14 is between 1.03 and 1.48 times the diameter of the groove 22. The width W of the groove measured at the surface 34 of the end members 12 and 14 must be between 4.90 and 8.67 times the depth of the groove 22. The depth $d$ of the groove 22 must have a relationship to the lower radius $R_2$ at corner 30 wherein the ratio is 0.75 to 3.50. The angle $\theta$ which the side walls 28 make with both the bottom surface 26 of the groove 22 and the surface 34 of the end members 12 or 14 must be between 40° and 65°.

The tube metal thickness, $T_2$ of the tubular member 16 must have a ratio of between 0.70 and 4.10 to the radius $R_1$ formed at the corner 32 where the side walls 28 meet the surface 34.

The end members 12 and 14 may also include knurled surfaces 24 which are formed with longitudinally extending grooves 36. The knurled surfaces 24 deter rotation of the tubular member 16 with respect to the end members 12 and 14.

Assembly of the composite rod assembly 10 is effected by sliding the tubular member 16 over the end members 12 and 14 such that the tubular member 16 extends beyond the groove 22. The tubular section 16 is then deformed by any conventional means, but preferably by electromagnetic forming to provide an annular indentation 38 which conforms essentially to the contour of the groove 22.

In practice it has been found that multi-piece control rods formed of tubular members 16 having an outer diameter of one inch and a wall thickness of 0.035 inches used in combination with end members having an outer diameter of 0.625 inches can withstand tension of 7,100 lbs. ultimate when formed in accordance with the present invention. The end members 12 and 14 were provided with a groove 22 having a diameter of 0.530 inches and a width of 0.275 inches. The radius at corner 30 where the bottom surface 26 meets the side walls 28 of the groove was 0.025 inches and the radius of the corners 32 where the side walls 28 meet the surface 34 of the end members 12 and 14 was 0.030 inches. The angle $\theta$ which the side walls 28 made with both the bottom surface 26 and the surface 34 was 60°. The material of the end members 12 and 14 was 2024 aliminum and 4130 steel and the tube material was 2024 aluminum. By comparison, a tubular member of the same size, shape, tube wall thickness and length attached to an end member by conventional rivets failed at 2,700 lbs. ultimate.

It should be noted that the combination of steel or aluminum end members 12 and 14 and aluminum tubular members 16 are particularly suitable for control rods.

It should be understood by those skilled in the art that various modifications may be made in the present invention without departing from the spirit and scope thereof, as described in the description and defined in the appended claims.

We claim:

1. An assembly of a tubular member permanently attached to an end member, to provide a minimum wall thickness of the tubular member for the required strength, comprising:

a groove in the end member receiving a deformed portion of said tubular member and having a major diameter wherein the ratio of the major diameter of the end member to groove diameter is between 1.03 and 1.48, the ratio of the width of the groove to the depth of the groove is between 4.90 and 8.67, the ratio of the depth of the groove to the radius of the lower corners of the groove is between 0.75 and 3.50, the angle which the sidewalls of the groove make with the surface formed by the major diameter of the groove is between 40° and 65° and the tube wall thickness of the tubular member has a relationship to the radius formed at the corner where the groove meets the surface formed by the major diameter of the end member such that their ratio is between 0.70 and 4.10.

2. An assembly as in claim 1 further comprising a knurled section on the end member in engagement with the inner surface of the tubular member.

3. An assembly as in claim 1 wherein the end member includes two grooves.

4. An assembly as in claim 3 wherein a knurled section is formed between the grooves on the surface of the end member.

* * * * *